(12) United States Patent
Agrawal et al.

(10) Patent No.: US 8,511,058 B2
(45) Date of Patent: Aug. 20, 2013

(54) CONVERTIBLE GAS TURBINE PROPULSION SYSTEM

(75) Inventors: Rajendra K. Agrawal, South Windsor, CT (US); Steven J. Sirica, Ellington, CT (US); William F. Schneider, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 1385 days.

(21) Appl. No.: 11/998,291

(22) Filed: Nov. 29, 2007

(65) Prior Publication Data

US 2009/0139202 A1 Jun. 4, 2009

(51) Int. Cl.
F02C 6/00 (2006.01)
F02G 1/00 (2006.01)
F02G 3/00 (2006.01)

(52) U.S. Cl.
USPC ......... 60/39.15; 60/39.163; 60/791; 60/39.17

(58) Field of Classification Search
USPC ........ 60/39.17, 39.15, 39.163, 791; 244/7 R, 244/7 A, 17.11, 17.13, 17.19, 17.21, 23 B, 244/23 D, 17.23, 17.25, 53 R, 55, 58, 60, 244/12.3
See application file for complete search history.

(56) References Cited

U.S. PATENT DOCUMENTS

| | | | |
|---|---|---|---|
| 2,381,417 A * | 8/1945 | Adams | 416/114 |
| 3,375,997 A * | 4/1968 | Gist, Jr. | 244/17.11 |
| 3,655,134 A | 4/1972 | Greenland et al. | |
| 3,678,690 A * | 7/1972 | Shohet et al. | 60/226.3 |
| 3,867,813 A | 2/1975 | Leibach | |
| 3,875,742 A | 4/1975 | McMurtry et al. | |
| 3,974,861 A | 8/1976 | Goto et al. | |
| 4,292,802 A * | 10/1981 | Snow | 60/204 |
| 4,615,354 A | 10/1986 | Bianchi | |
| 4,631,914 A | 12/1986 | Hines | |
| 4,936,748 A | 6/1990 | Adamson et al. | |
| 5,098,022 A | 3/1992 | Thayer | |
| 5,160,080 A | 11/1992 | Hines et al. | |
| 5,163,286 A * | 11/1992 | Jaw | 60/39.17 |
| 5,230,362 A | 7/1993 | Goodman | |
| 5,243,817 A | 9/1993 | Matthias | |
| 5,351,476 A | 10/1994 | Laborie et al. | |
| 5,419,361 A | 5/1995 | Caudle et al. | |
| 5,778,659 A | 7/1998 | Duesler et al. | |
| 6,134,876 A | 10/2000 | Hines et al. | |
| 6,270,038 B1 | 8/2001 | Cycon et al. | |
| 6,415,597 B1 | 7/2002 | Futamura et al. | |
| 6,634,596 B2 | 10/2003 | Albero et al. | |
| 6,779,967 B2 | 8/2004 | Friedl et al. | |

(Continued)

Primary Examiner — William H Rodriguez
Assistant Examiner — Craig Kim
(74) Attorney, Agent, or Firm — Kinney & Lange, P.A.

(57) ABSTRACT

A convertible gas turbine propulsion system operates in multiple output modes. The convertible gas turbine propulsion system comprises a gas generator, a first power turbine, a secondary propulsion system and an exhaust duct. The gas generator is configured to produce exhaust gas. The first power turbine is aligned with the gas generator to receive the exhaust gas. The secondary propulsion system is in series with the gas generator and the first power turbine. The exhaust duct coaxially extends from the first power turbine to the secondary propulsion system. The exhaust duct includes an exhaust port for opening the exhaust duct to ambient air pressure and permitting exhaust gas to bypass the secondary propulsion system. In various embodiments of the invention, the first power turbine is connected to a first rotary propulsion system, and the secondary propulsion system comprises a second power turbine or a nozzle.

23 Claims, 7 Drawing Sheets

(56) References Cited

U.S. PATENT DOCUMENTS

| | | |
|---|---|---|
| 6,837,038 B2 | 1/2005 | Eiler et al. |
| 6,868,664 B2 | 3/2005 | Albero et al. |
| 6,968,674 B2 | 11/2005 | Wollenweber |
| 6,971,240 B2 | 12/2005 | Wollenweber |
| 7,059,136 B2 | 6/2006 | Coffinberry |
| 7,089,744 B2 | 8/2006 | Epstein |
| 7,121,078 B2 | 10/2006 | Turco et al. |
| 7,150,429 B2 | 12/2006 | Kusic |
| 7,246,482 B2 | 7/2007 | Mahoney et al. |
| 2004/0103666 A1 | 6/2004 | Jonsson et al. |
| 2006/0005529 A1 | 1/2006 | Penda et al. |
| 2007/0101696 A1* | 5/2007 | Dooley .................. 60/203.1 |
| 2007/0234736 A1 | 10/2007 | Corsmeier |

* cited by examiner

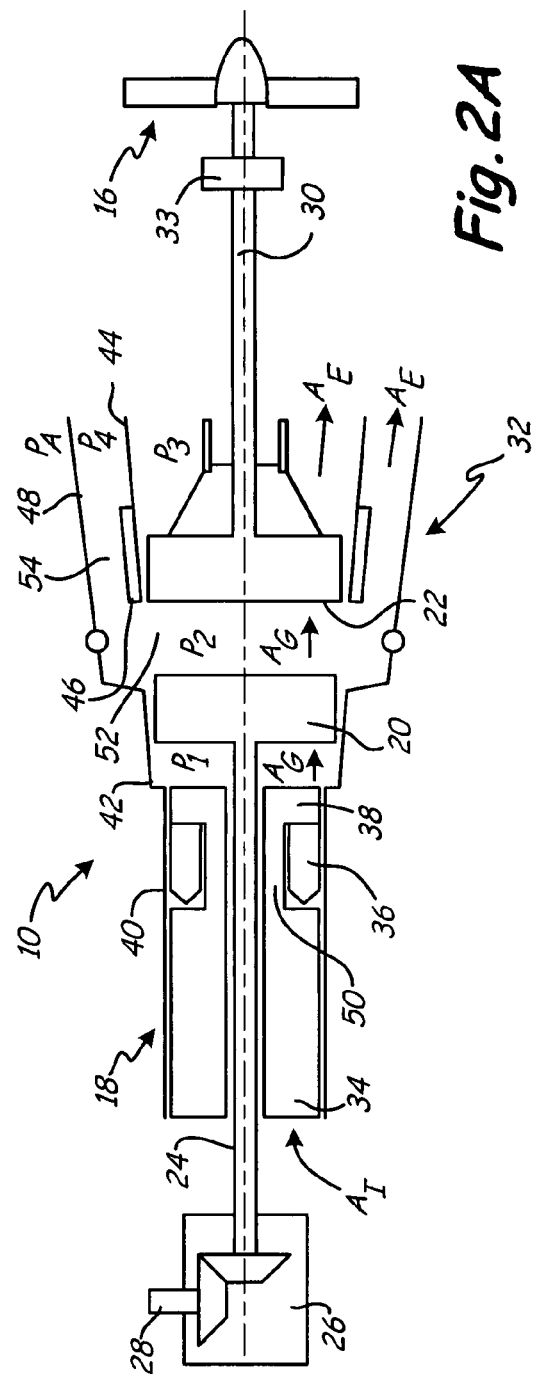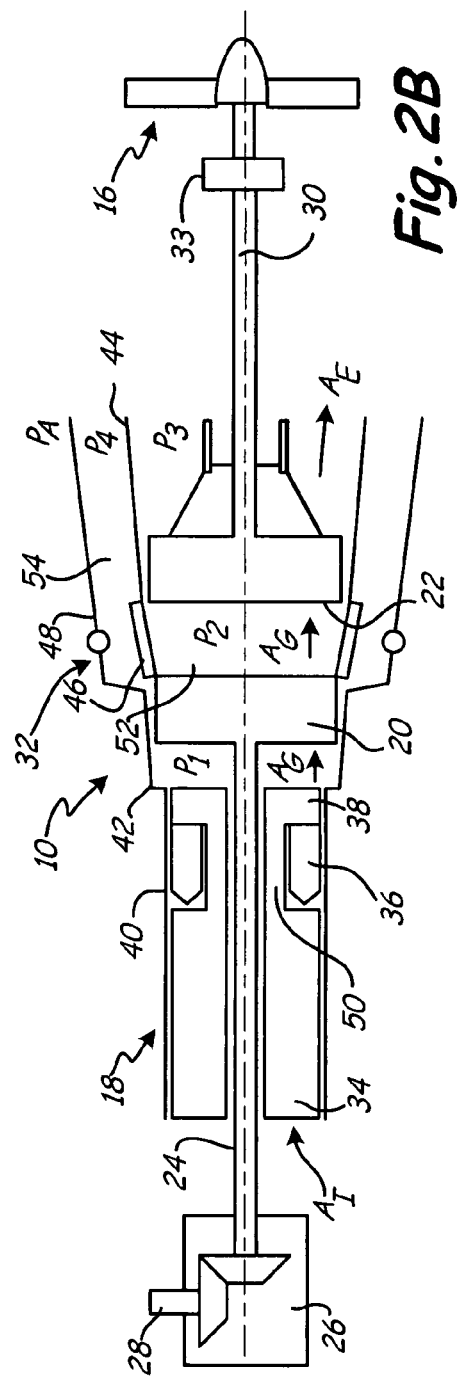

CONVERTIBLE GAS TURBINE PROPULSION SYSTEM

CROSS-REFERENCE TO RELATED APPLICATION(S)

The present application is related to the following co-pending application filed on the same day as this application: "ACTUATION MECHANISM FOR A CONVERTIBLE GAS TURBINE PROPULSION SYSTEM" by inventors R. Agrawal and G. Reinhardt Ser. No. 11/998,248.

BACKGROUND

This invention relates generally to gas turbine propulsion systems and more particularly to gas turbine propulsion systems that are convertible between two modes of operation. Rotorcrafts such as helicopters rely primarily on large rotating blades to produce both the lift necessary to stay aloft and the thrust necessary for propulsion. In order to produce both thrust and lift, the blades rotate in a plane generally parallel to the velocity vector of the craft, with blades advancing and retreating in the direction of flight of the craft. Due to low relative air speed or excessive angle of attack of the retreating blades, various flight instabilities and aerodynamic inefficiencies arise which limit the maximum, safe airspeed of a typical rotorcraft. In order to overcome the maximum velocity ceiling of rotorcrafts, various designs have incorporated secondary propulsion system to provide additional thrust. For example, rotorcrafts have incorporated rear propellers that rotate in a plane generally perpendicular to the velocity vector of the aircraft that produce only forward (or backward) thrust. Such secondary propulsion systems require input power that is typically siphoned off of the power supplied to the primary rotor blades.

Gas turbine propulsion systems produce a large amount of rotating shaft power available to both primary and secondary propulsion systems, and thus are popular choices for dual propulsion rotorcrafts such as helicopters. Typically, a turboshaft design is used wherein a gas generator is used to drive a gas generating turbine to compress inlet ambient air and sustain combustion, and a power turbine that drives a free shaft, which is then coupled to the rotor blades through a gearbox. A supplemental output from the free shaft can also be coupled to a secondary propulsion system, such as a propeller, to produce additional thrust. Typically, the supplemental output from the free shaft is mechanically coupled with the secondary propulsion system with a mechanical clutch actuation system. To engage the secondary propulsion system, clutch-type actuation mechanisms mechanically couple the secondary propulsion system with the primary propulsion system. Thus, not only does the secondary propulsion system directly reduce the amount of power available to the primary propulsion system, the mechanical clutch coupling limits free operation of the secondary propulsion system since the secondary propulsion system must rotate at speeds dictated by the free shaft. Thus, there is a need for a convertible propulsion system that provides greater flexibility in distributing power between primary and secondary propulsion systems.

SUMMARY

The present invention is directed toward a convertible gas turbine propulsion system operable in multiple output modes. In one embodiment, the convertible gas turbine propulsion system comprises a gas generator, a first power turbine, a second power turbine and one or more ducts. The gas generator is configured to produce high pressure exhaust gas. The first power turbine is aligned with the gas generator turbine to receive the exhaust gas. The second power turbine is in series with the gas generator turbine and the first power turbine. The two power turbines are aerodynamically connected through a coaxial inter-turbine duct that extends from the first power turbine to the second power turbine. The inter-turbine duct includes an adjustable port for exhausting the gas between the first and second power turbines to ambient air pressure, thus bypassing the second power turbine. In one embodiment of the invention, the first power turbine is connected to a first propulsion system, typically a main rotor, and the second power turbine is connected to a second propulsion system, typically a pusher propeller. In another embodiment, the second power turbine is replaced with a thrust producing exhaust nozzle.

BRIEF DESCRIPTION OF THE DRAWINGS

FIG. 2A shows a schematic diagram of the convertible gas turbine propulsion system of FIG. 1 operating in low speed or hover mode.

FIG. 2B shows a schematic diagram of the convertible gas turbine propulsion system of FIG. 1 operating in high speed or cruise mode.

DETAILED DESCRIPTION

Figure 1:
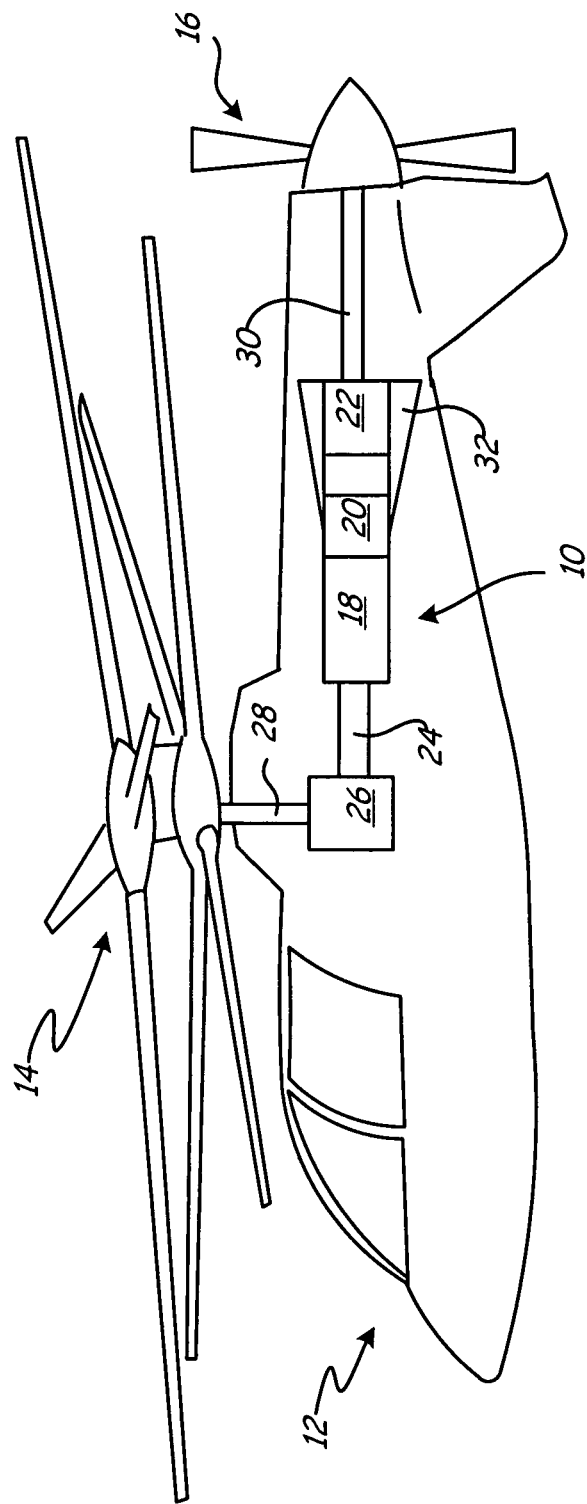
FIG. 1 shows a rotorcraft having a convertible gas turbine propulsion system of the present invention.

FIG. 1 shows one embodiment of a rotorcraft in which convertible gas turbine propulsion system 10 of the present invention can be used. FIG. 1 shows helicopter 12 having convertible gas turbine propulsion system 10 configured for driving main rotor 14 and pusher propeller 16. Main rotor 14 and pusher propeller 16 allow helicopter 12 to operate in a variety of modes, such as forward and reverse vectoring, vertical take-off and landing, hovering and cruising at pilot commanded forward speeds. As such, helicopter 12 is able to fulfill various mission requirements for commercial, civil and military operations. Although convertible gas turbine propulsion system 10 is shown being used for driving main rotor 14 and propeller 16 in helicopter 12, propulsion system 10 can be used in conjunction with a variety of rotorcraft to drive a variety of propulsion systems. For example, pusher propeller 16 could be replaced with an exhaust nozzle, and main rotor 14 could be replaced with a turbo-prop for use in a fixed wing aircraft.

Convertible gas turbine propulsion system 10 includes gas generator 18, first power turbine 20 and second power turbine 22. Gas generator 18 comprises a gas turbine engine for generating high pressure, high energy gases for turning first power turbine 20 and second power turbine 22. First power turbine 20 provides rotating shaft energy to main rotor 14 through horizontal shaft 24, gearbox 26 and vertical shaft 28 such that main rotor 14 rotates in a generally horizontal plane parallel to the plane in which helicopter 12 travels. Due to rotation in the generally horizontal plane, main rotor 14 always produces some amount of upward lift. Forward thrust is produced by, among other things, adjusting the pitch and tilt of the rotor blades. Second power turbine 22 provides rotating shaft energy to pusher propeller 16 through horizontal shaft 30 such that pusher propeller 16 rotates in a generally vertical plane perpendicular to the plane in which helicopter 12 travels. When operating, pusher propeller 16 always provides forward thrust to helicopter 12 due to its rotation in the vertical plane. It is necessary, however, to eliminate forward thrust produced by pusher propeller 16 such that helicopter 12 is able to operate in hover mode. As such, convertible gas turbine propulsion system is provided with exhaust system 32 to permit selective operation of second power turbine 22. In high speed and cruise modes, exhaust system 32 directs combustion gases through second power turbine 22 to obtain additional forward thrust from pusher propeller 16. In low speed and hover modes, exhaust system 32 permits combustion gases to bypass second power turbine 22 such that helicopter 12 can operate similar to that of a conventional helicopter with the required thrust being produced by main rotor 14. Exhaust system 32 permits second power turbine 22 to be mechanically uncoupled from first power turbine 20 thereby allowing performance characteristics of first power turbine 20 and second power turbine 22 to be individually designed and adjusted.

FIGS. 2A and 2B show schematic diagrams of convertible gas turbine propulsion system 10 of FIG. 1 operating in low speed and high speed modes, respectively. Convertible gas turbine propulsion system 10 includes gas generator 18, first power turbine 20, second power turbine 22 and exhaust system 32. First power turbine 20 is connected to main rotor 14 through shaft 24, gear box 26 and shaft 28. Second power turbine 22 is connected to pusher propeller 16 through shaft 30 and gearbox 33. Gas generator 18 includes compressor section 34, combustor 36, gas generator turbine 38 and gas generator casing 40. Exhaust system 32 includes forward duct 42, inner duct 44, retractable port 46 and outer duct 48, which acts as a secondary exhaust duct to conduct exhaust gas out of first power turbine 20 and second power turbine 22. Gas generator casing 40, which acts as a primary exhaust duct, comprises an annular passageway surrounding gas generator 18 such that inlet air can be routed into compressor section 34 to produce compressed air and exhaust gas can be directed out of gas generator turbine 38. With the addition of a fuel, a combustion process is carried out within combustor 36 to produce combustion gases. Forward duct 42 guides the combustion gases through first power turbine 20, while inner duct 44, retractable port 46 and outer duct 48 selectively guide the combustion gases through second power turbine 22.

Compressor section 34 comprises a series of rotating blades that drive inlet air $A_1$ past a series of stationary vanes to increase the pressure of inlet air $A_1$. A fuel from injectors (not shown) is added to inlet air $A_1$ within combustor 36 such that a combustion process can be carried out to produce high energy combustion gases $A_G$ for turning gas generator turbine 38, first power turbine 20 and second power turbine 22. Gas generator turbine 38 is connected to compressor section 34 through shaft 50 and provides rotating shaft power to compressor section 34 such that compressed air is continuously supplied to combustor 36 to sustain the combustion process. Casing 40 surrounds the gas flow path of gas generator 18 and is sealed such that combustion gases $A_G$ can be delivered to first power turbine 20 and second power turbine 22 to perform useful work. As a result of the combustion process, combustion gases $A_G$ are delivered to forward duct 42 in a high pressure, high energy state having pressure $P_1$, which is significantly higher than ambient pressure $P_A$.

Forward duct 42 is connected to the downstream end of gas generator casing 40 and concentrically surrounds first power turbine 20. Forward duct 42 receives combustion gases $A_G$ from gas generator turbine 38. Combustion gases $A_G$ exit gas generator turbine and impinge upon the blades of first power turbine 20 to produce rotational movement of first power turbine 20. As combustion gases $A_G$ travel from combustor 36 and gas generator turbine 38 they are continuously depressurizing and ultimately expanding to ambient pressure $P_A$ as the turbine blades extract kinetic energy from combustion gases $A_G$. Thus, after passing through first power turbine 20, combustion gases $A_G$ reach pressure $P_2$ in pressure chamber 52 between first power turbine 20 and second power turbine 22, which is less than $P_1$. Accordingly, a pressure differential is produced across first power turbine ($P_1-P_2$), which defines the work capability of first power turbine 20 and, depending on the torque of main rotor 14, dictates the speed at which first power turbine 20 rotates. First power turbine 20 rotates shaft 24, which through gearbox 26 and shaft 28 drives rotor 14. The pressure differential ($P_1-P_2$) is modulated by controlling fuel flow to combustor 36. Thus, the speed of rotor 14 is controlled by directly controlling the operating characteristics of gas generator 18 and first power turbine 20. Gas generator 18 and first power turbine 20 function in a conventional manner and operate as a turboshaft gas turbine engine.

Inner duct 44, retractable port 46, and outer duct 48 dictate the mode in which combustion gases $A_G$ leave first power turbine 20 to exit convertible gas turbine propulsion system 10 as exhaust gas $A_E$. Specifically, exhaust system 32 modulates the magnitude of pressure $P_2$ between first power turbine 20 and second power turbine 22 within pressure chamber 52. Outer duct 48 is connected at the downstream end of forward duct 42 to form an outer annular exhaust path for combustion gas $A_G$ and exhaust gas $A_E$. Outer duct 48 extends radially outward from the downstream end of first power turbine 20 to beyond the perimeter of inner duct 44, and axially past the downstream end of second power turbine 22. Inner duct 44 is disposed within outer duct 48 and extends from the upstream end of second power turbine 22 past the downstream end of second power turbine 22. Together, outer duct 48 and inner duct 44 form bypass passage 54 around second power turbine 22. Retractable port 46 provides a means for selectively routing combustion gases $A_G$ into inner duct 44 or permitting combustion gases $A_G$ to flow around inner duct 44. In the embodiment shown, retractable port 46 comprises a moveable annular ring that can be disposed between forward duct 42 and inner duct 44 to force combustion gases $A_G$ to flow through second power turbine 22 (FIG. 2B), or can be disposed between outer duct 48 and inner duct 44 to permit combustion gases $A_G$ to bypass second power turbine 22 (FIG. 2A).

FIG. 2A shows a schematic diagram of convertible gas turbine propulsion system 10 of FIG. 1 operating in low speed or hover mode. Retractable port 46 is positioned such that combustion gases $A_G$ are able to bypass second power turbine 22 and enter passage 54. Passage 54 opens to the atmosphere such that pressure $P_4$ within passage 54 is approximately equal to ambient pressure $P_A$. With retractable port 46 retracted, chamber 52 is also open to passage 54 and the atmosphere such that pressure $P_2$ is also approximately equal to ambient pressure $P_A$. Pressure $P_3$ at the downstream end of second power turbine 22 is also exposed to ambient pressure $P_A$ as exhaust system 32 opens to the atmosphere to expel exhaust gas $A_E$. Thus, the pressure difference $(P_2-P_3)$ across second power turbine 22 is approximately equal to zero and negligible work is extracted from second power turbine 22. Due to the negligible pressure differential, pusher propeller 16 is not driven by combustion gas $A_G$ and is free to "windmill" in the atmosphere as helicopter 12 travels. Pusher propeller 16 is typically locked down with a mechanical brake for, among other reasons, safety. Accordingly, pusher propeller 16 generates no forward thrust and helicopter 16 is propelled by output of first power turbine 20, namely, the rotation of main rotor 14. Thus, helicopter 16 is operable in hover mode or other low speed modes similar to that of a conventional helicopter. As discussed earlier, horizontally rotating rotor blades are limited in the amount of speed they can produce. Thus, to achieve speeds beyond what is available from rotor 14, retractable port 46 of exhaust system 32 is moved into position to direct combustion gas $A_G$ through second power turbine 22 to drive pusher propeller 16.

FIG. 2B shows a schematic diagram of convertible gas turbine propulsion system 10 of FIG. 1 operating in high speed and cruise mode. Retractable port 46 is positioned between forward duct 42 and inner duct 44 such that a contiguous duct is formed around first power turbine 20, chamber 52 and second power turbine 22. Retractable port 46 prevents combustion gases $A_G$ from entering bypass passage 54 and outer duct 48, and forces combustion gases $A_G$ to enter second power turbine 22. Additionally, the position of retractable port 46 prevents ambient air from mixing with combustion gases $A_G$ between first power turbine 20 and second power turbine 22 within pressure chamber 54. As a result, combustion gases $A_G$ are forced through second power turbine 22. Combustion gases $A_G$ enter the upstream end of second power 22 turbine at pressure $P_2$, expand and depressurize, then exit the downstream end of second power turbine 22 at pressure $P_3$.

Since pressure chamber 54 between first power turbine 20 and second power turbine 22 is sealed from ambient pressure $P_A$, pressure $P_2$ remains greater than ambient pressure $P_A$, but less than pressure $P_1$, such that first power turbine 20 extracts energy from combustion gases $A_G$. The downstream end of second power turbine 22 is open to atmospheric pressure $P_A$ such that as combustion gases $A_G$ work their way through second power turbine 22, they lose pressure such that pressure $P_3$ is approximately equal to ambient pressure $P_A$, which is less than pressure $P_2$. Thus, second power turbine 22 extracts energy from combustion gases $A_G$ and converts it to rotation of shaft 30 to drive pusher propeller 16. Thus, combustion gases $A_G$, which would otherwise be expelled from first power turbine 20 and released to the atmosphere in a conventional gas turbine engine, are put to work again to drive pusher propeller 16. Pusher propeller 16 provides additional horizontal thrust to helicopter 12 such that velocities above what can be provided by rotor 14 alone can be achieved.

Figure 4A:
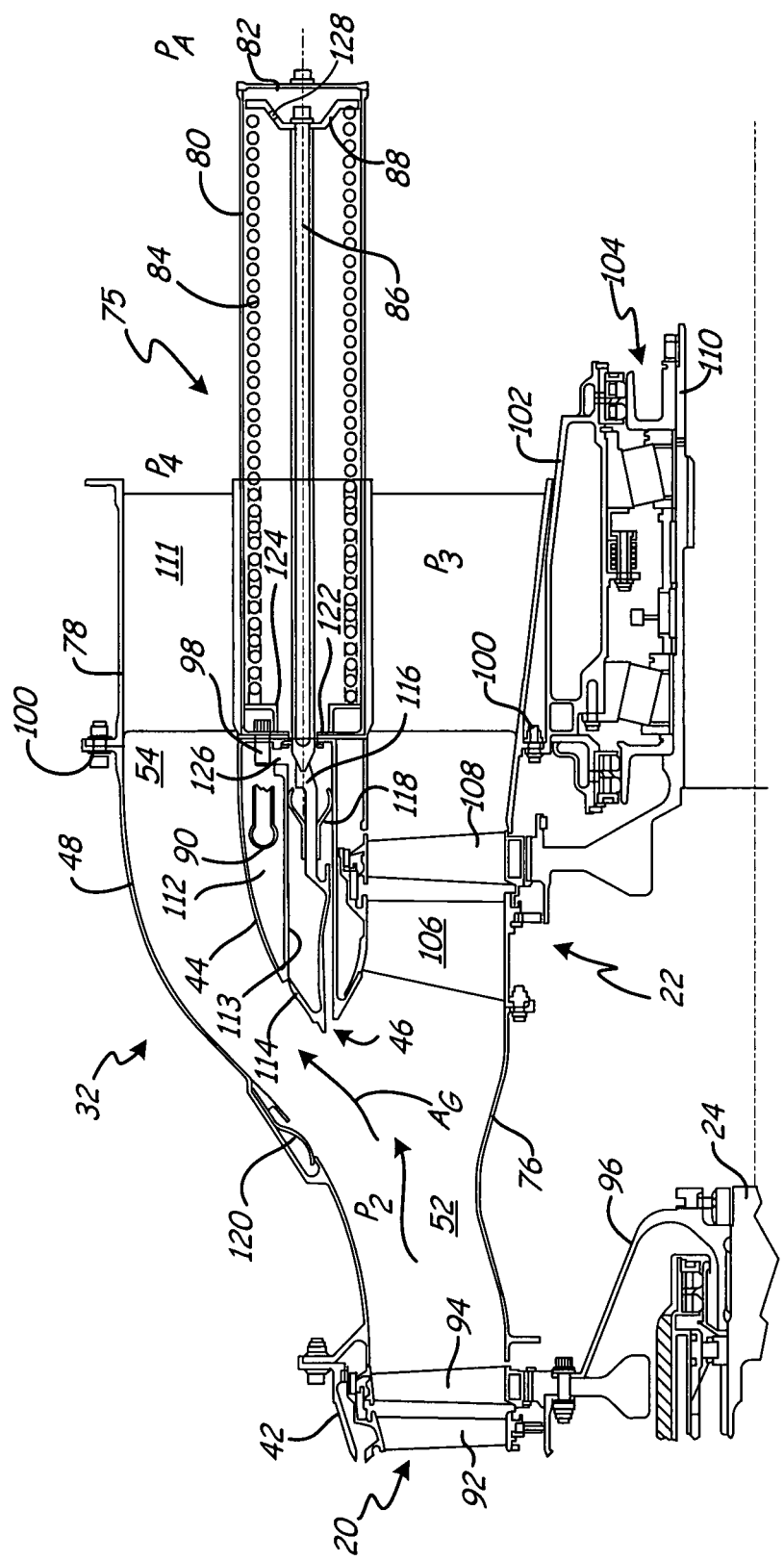
FIG. 4A shows a cross-sectional view of a second embodiment of a pneumatic actuator configured for operating the gas turbine propulsion system of FIG. 2A in low speed or hover mode.
Figure 4B:
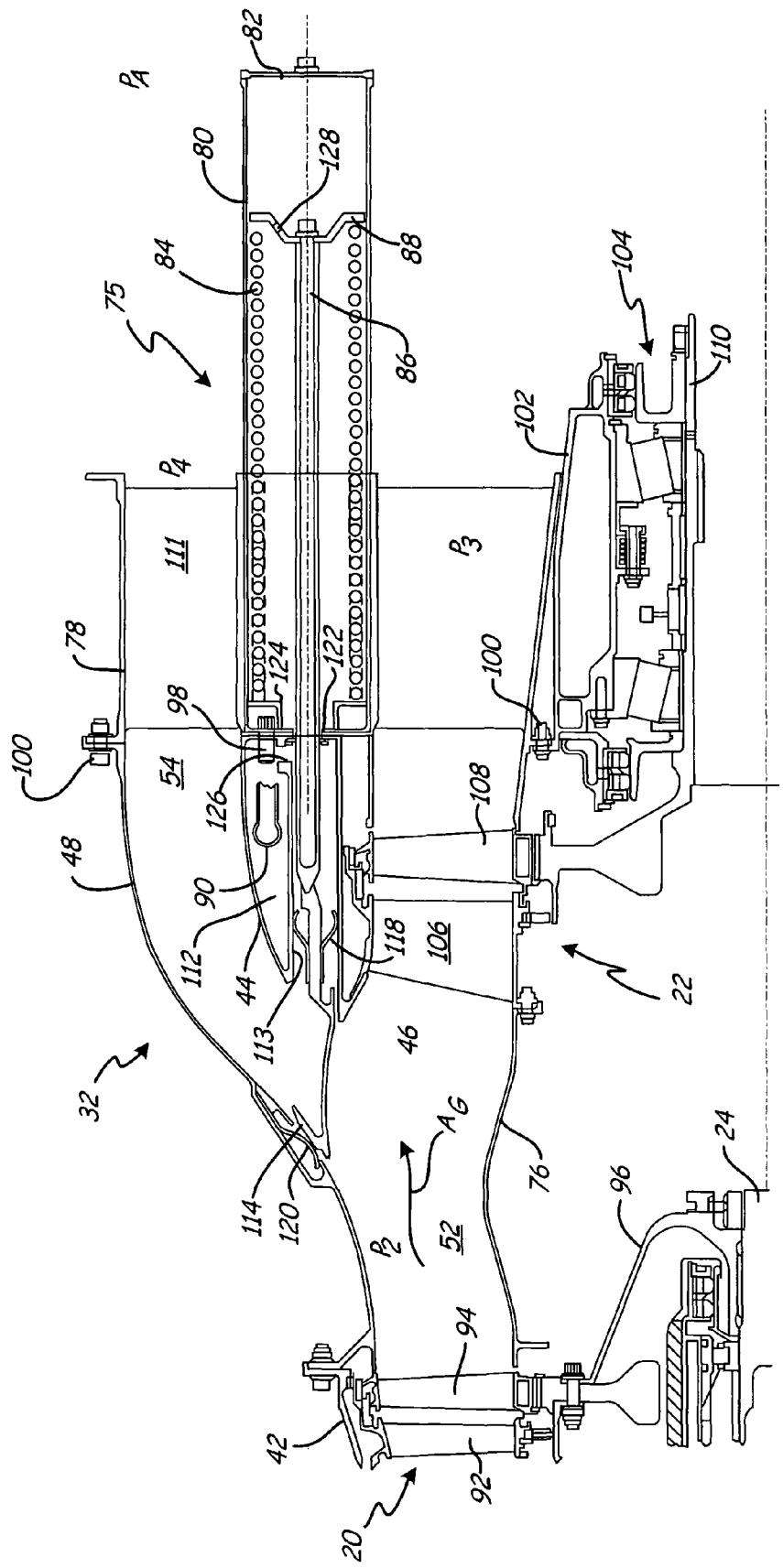
FIG. 4B shows a cross-sectional view of the second embodiment of the pneumatic actuator of FIG. 4A configured for operating the gas turbine propulsion system of FIG. 2A in high speed or cruise mode.

Second power turbine 22 extracts energy from the combustion process that would otherwise be available for driving first power turbine 20. Thus, at high forward speeds, work available from first power turbine 20 that would have been inefficiently used by main rotor 14 is redirected to second power turbine 22, and is used more efficiently by propeller 16 and results in better overall fuel economy. Power distribution between main rotor 14 and propeller 16 is changed by changing pressure $P_2$ within pressure chamber 52 to change the pressure ratios $(P_1-P_2)$ and $(P_2-P_3)$. This can be accomplished by appropriately sizing the aerodynamic flow areas of first power turbine 20 and second power turbine 22, or by varying the flow area of second power turbine 22 through the incorporation of variable area vanes (such as is discussed later with respect to variable vanes 138 of FIG. 5). In one embodiment, the power is split 40/60 between first power turbine 20 and second power turbine 22, respectively, during high speed operation of convertible gas turbine propulsion system 10 and is achieved by appropriately sizing the aerodynamic flow areas of first power turbine 20 and second power turbine 22 (i.e. fixed area vanes 106 are used, as shown in FIGS. 4A and 4B). However, specific distribution of power between first power turbine 20 and second power turbine 22 is based on design needs and other factors such as the rotational speed of shaft 24, the gas flow rate through gas generator 18, the inlet and outlet temperatures and pressures of first power turbine 20, the number of turbine stages in first and second power turbines 20 and 22, the use of variable vanes, and the desired power output of second power turbine 22. It is contemplated that up to eighty percent of the power generated from propulsion system 10 could be generated by second power turbine 22. To return propulsion system 10 to low speed operation, exhaust system 32 is simply returned to the configuration of FIG. 2A, where overall fuel efficiency increases due to improved efficiency of main rotor 14 operating in the low speed and hover mode like that of a conventional helicopter.

In another embodiment of convertible gas turbine propulsion system 10, second power turbine 22 is omitted in favor of a thrust producing exhaust nozzle. In such a configuration, second power turbine 22, shaft 30 and propellers 16 would be removed from inside inner duct 44 and propulsion system 10 completely, and inner duct 44 would be configured as an exhaust nozzle. For example, inner duct 44 could be configured as a conventional converging or converging-diverging nozzle to accelerate the flow of the exhaust gas, as is known in the art. Retractable port 46 would similarly operate to open and close bypass passage 54. With retractable port 46 open, the pressure differential across the exhaust nozzle would not be large enough to accelerate the mass flow of exhaust gas $A_E$ through the nozzle shaped from inner duct 44. With retractable port 46 closed, however, the pressure differential across the exhaust nozzle would be large enough to produce additional thrust from exhaust gas $A_E$. For a typical turboshaft configuration of first power turbine 20 and gas generator 18, exhaust gas $A_E$ would be subsonic such that a convergent exhaust nozzle would be used. In other embodiments, however, divergent or convergent-divergent nozzles could be used.

Figure 3A:
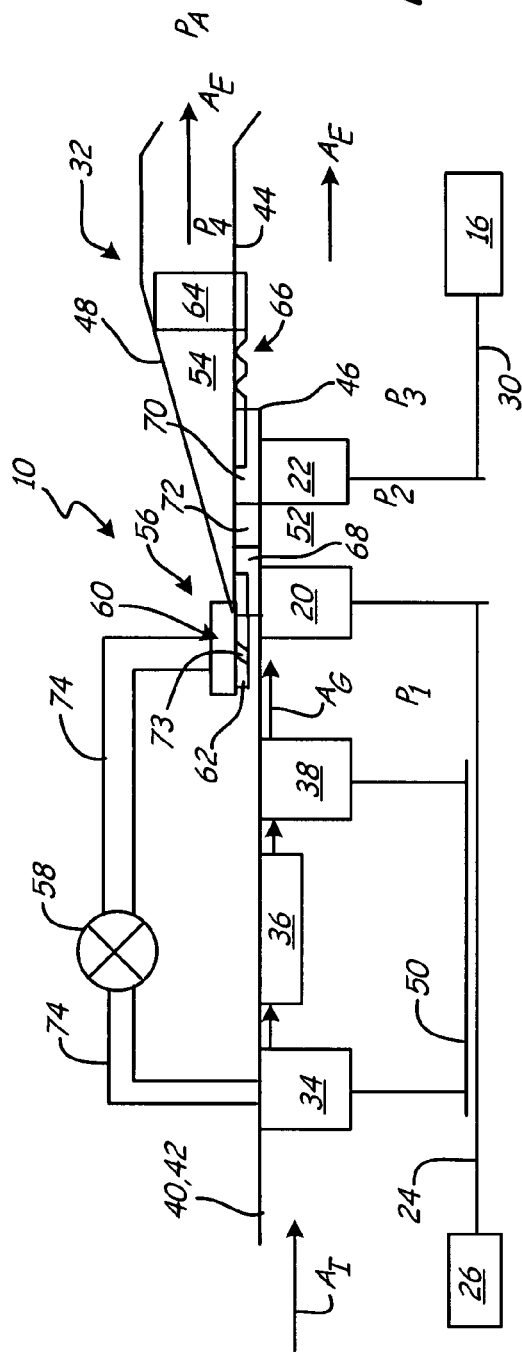
FIG. 3A shows a schematic diagram of a first embodiment of a pneumatic actuator configured for operating the gas turbine propulsion system of FIG. 2A in low speed or hover mode.
Figure 3B:
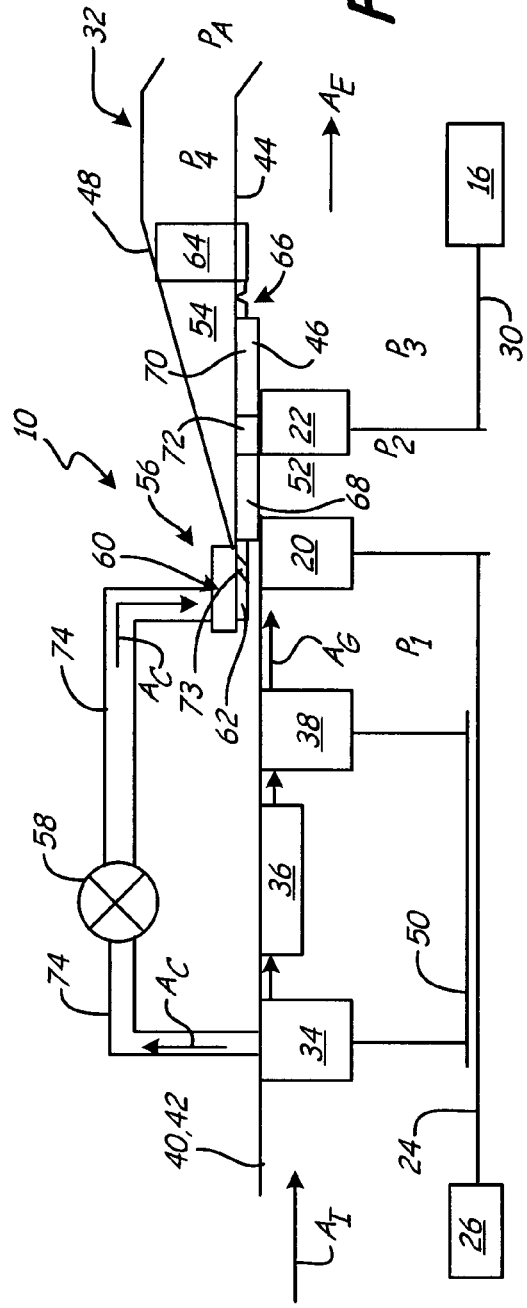
FIG. 3B shows a schematic diagram of the first embodiment of the pneumatic actuator of FIG. 3A configured for operating the gas turbine propulsion system of FIG. 2B in high speed or cruise mode.

FIGS. 3A and 3B show schematic diagrams of a first embodiment of a pneumatic actuator configured for operating gas turbine propulsion system 10 in low speed or high speed modes, respectively. Gas turbine propulsion system 10 includes pusher propeller 16, gas generator 18, first power turbine 20, second power turbine 22, shaft 24, gear box 26, shaft 28, shaft 30, exhaust system 32, compressor section 34, combustor 36, gas generator turbine 38, gas generator casing 40, forward duct 42, inner duct 44, retractable port 46, outer duct 48, shaft 50, chamber 52 and passageway 54, which function similarly to what is described with respect to FIGS. 2A and 2B. As such, second power turbine 22 receives input power from gas generator 18 and first power turbine 20, and supplies output power to propeller 16 when actuator 56 pushes retractable port 46 rearward to the closed position. In the embodiment shown, pneumatic actuator 56 includes plenum 60, thruster 62, strut 64 and spring 66. Retractable port 46 includes forward guide 68, aft guide 70 and bypass opening 72. Pneumatic actuator 56 receives compressor bleed air $A_C$ from compressor section 34 through valve 58 to actuate retractable port 46. Additionally, plenum 60 introduces air $A_C$ into nozzle 73 of thruster 62, which accelerates air $A_C$ through thruster 62 to provide axial thrust to overcome the spring force and push retractable port 46 rearward.

In FIG. 3A, valve 58 is closed such that retractable port 46 is in the forward, open position. Retractable port 46 is configured for sliding on rails or tracks between inner duct 44 and plenum 60. The rear end of retractable port 46 is connected with spring 66. Spring 66 is disposed between retractable port 46 and strut 64. Strut 64 comprises a support structure for supporting outer duct 48 about inner duct 44. A bottom portion of strut 64 extends through inner duct 44 to provide a backstop for spring 66. Spring 66 is sized to push retractable port 46 in the forward direction to the forward position. In the forward position, forward guide 68 of retractable port 46 is disposed adjacent forward duct 42 above first power turbine 20, and aft guide 70 is disposed adjacent inner duct 44 above second power turbine 22. Bypass opening 72 is, therefore, disposed between outer duct 48 and pressure chamber 52, which, through passageway 54, is exposed to ambient pressure $P_A$. Additionally, in the forward position, thruster 62 is disposed adjacent plenum 60 such that it is positioned for receiving compressor bleed air $A_C$ from compressor section 34 through valve 58. However, in the low speed mode shown in FIG. 3A, valve 58 is closed such that compressor air $A_C$ is not delivered to thruster 62, and spring 66 biases adjustable portion to the forward position. As such, combustion gases $A_G$ are passed through passageway 54 such that a negligible pressure differential ($P_3$-$P_2$) is produced across second power turbine 22. Thus, second power turbine 22 does not extract power from combustion gases $A_G$, and pusher propeller 16 does not produce forward thrust. In this embodiment, the forward positioning of retractable port 46 such that pressure chamber 52 is open to ambient pressure is the default, fail safe mode of operation for exhaust system 32. For example, in the event of failure of valve 58, retractable port 46 is pushed by spring 66 to the forward position to open chamber 52 such that engine 10 operates to drive main rotor 14 as a conventional turboshaft, which is the most fuel efficient mode of operation.

In FIG. 3B, valve 58 is opened such that retractable port 46 is pushed to the rearward position. Valve 58 is opened to permit a portion of inlet air $A_I$ compressed within compressor section 34 to be bled off into conduit 74. Valve 58 is connected to compressor section 34 and plenum 60 by conduit 74, which comprises any suitable means for conducting compressor bleed air $A_C$. In various embodiments, suitable compressed air for pressurizing plenum 60 can be bled from any source of pressurized air within engine 10, such as a high or low pressure compressor. In one embodiment, conduit 74 comprises stainless steel piping. Conduit 74 delivers compressor air $A_C$ to plenum 60 such that plenum 60 becomes pressurized. The inlet of nozzle 73 is adjacent plenum 60 and the exit of nozzle 73 is open to ambient pressure $P_A$. Nozzle 73 is angled in the forward direction as nozzle 73 extends from inlet to exit. In one embodiment, compressor air $A_C$ is delivered to plenum 60 at sub-sonic speeds and nozzle 73 comprises a converging or converging-diverging nozzle. As, such, nozzle 73 accelerates compressor air $A_C$ in the forward direction as bleed air $A_C$ is expanded to ambient pressure $P_A$. Thruster 62 reacts the forward force of compressor air $A_C$, thus causing rearward movement of thruster 62 and retractable port 46. The size and length of spring 66 and the position of strut 64 prevent retractable port 46 from moving too far in the aft direction and determine the force that nozzle 73 must generate. Retractable port 46 is pushed back such that opening 72 is retracted between inner duct 44 and second power turbine 22. Forward guide 68 is retracted to separate passageway 54 from chamber 52. As such, combustion gases $A_G$ bypass passageway 54 and pass through chamber 52 such that an operative pressure differential ($P_3$-$P_2$) is produced across second power turbine 22. Thus, pusher propeller 16 produces forward thrust and gas turbine propulsion system 10 operates in high speed or cruise mode. In one embodiment, valve 58 is controlled by an automated control system, such as a FADEC (Full Authority Digital Engine Control), to control opening and closing of valve 58. The automated control system regulates the discharge of pressurized air from valve 58 to adjust the amount of overlap between bypass opening 72 and bypass passage 54. As such the pressure differential ($P_3$-$P_2$) across second power turbine 22 can be varied to control thrust output of propeller 16. To cease high speed operation and powered output of propeller 16, valve 58 closes to stop providing compressor air $A_C$ to plenum 60, and a vent hole incorporated into valve 58 is opened to relieve pressure within conduit 74 between plenum 60 and valve 58.

Retractable port 46 is slid along the aforementioned rails to close off passage 54 from exhaust gas $A_E$. In one embodiment, the rails are dovetail shaped to prevent rotation of retractable port 46 between outer duct 48 and inner duct 44. By maintaining proper alignment, dovetail shaped rails also minimize thrust requirements of thruster 62 by reducing friction. Thruster 62 must produce enough rearward thrust to overcome the forward force of spring 66. In other embodiments, thruster 62 includes a plurality of nozzles. The specific size, number and geometry (e.g. converging or converging-diverging) of nozzles depends on the specific thrust required to move retractable port 46, which depends on the size and performance requirements of gas turbine propulsion system 10. Pneumatic actuator 56 is particularly well-suited for generating thrust levels for actuating retractable port 46 scaled for use with small-sized or low-thrust gas turbine propulsion systems. Exhaust system 32 is also configurable with other types of pneumatic actuators for use in larger scale or high-thrust gas turbine propulsion systems 10.

FIGS. 4A and 4B show cross-sectional views of a second embodiment of a pneumatic actuator configured for operating gas turbine propulsion system 10 in low speed or high speed modes, respectively. FIG. 4A shows exhaust system 32 of convertible gas turbine propulsion system 10 with pneumatic actuator 75 configured for low speed or hover mode operation. Propulsion system 10 includes first power turbine 20 and second power turbine 22, and exhaust system 32 includes forward duct 42, inner duct 44, retractable port 46 and outer duct 48, which function similarly to what is described with respect to FIGS. 2A and 2B. Exhaust system 32 also includes inner guide 76 and aft duct 78. Pneumatic actuator 75 comprises canister 80, cover 82, spring 84, push rod 86, piston spring head 88 and compressor air manifold 90. Actuator 75 comprises an automated piston that retracts and extends retractable port 46 into and from inner duct 44 to selectively permit flow of exhaust gas $A_G$ from first power turbine 20 to enter outer duct 48, thereby bypassing second power turbine 22.

Outer duct 48 is connected with forward duct 42, which surrounds first power turbine 20. First power turbine 20 includes vanes 92 and blades 94, through which exhaust gas $A_G$ flows. Stub shaft 96 connects first power turbine 20 to shaft 24, and drives main rotor 14 (FIGS. 2A & 2B). Inner duct 44 is positioned between outer duct 48 and second power turbine 22 to form bypass passage 54. Outer duct 48 and inner flow guide 76 form pressure chamber 52 and direct exhaust gases $A_G$ toward inner duct 44 such that combustion gases $A_G$ can enter bypass passage 54 or second power turbine 22. Inner flow guide 76 is aerodynamically designed to minimize losses and in one embodiment includes a bump to stream line the flow between first power turbine 20 and second power turbine 22, or between power turbine 20 and bypass passage 54. Inner duct 44 and aft duct 78 comprise annular rings that surround second power turbine 22 and guide exhaust from engine 10, respectively. The outer surface of inner duct 44 forms the inner surface of bypass passage 54, and the outer surface of aft duct 78 forms the outer surface of bypass passage 54. The inner surface of inner duct 44 forms the outer surface of the flow path for second power turbine 22, and the inner surface of aft duct 78 forms the inner surface of the flow path for second power turbine 22. Likewise, in another embodiment of the invention, the inner surface of inner duct 44 and the inner surface of aft duct 78 can be configured as an exhaust nozzle to supplement or replace second power turbine 22.

Figure 5:
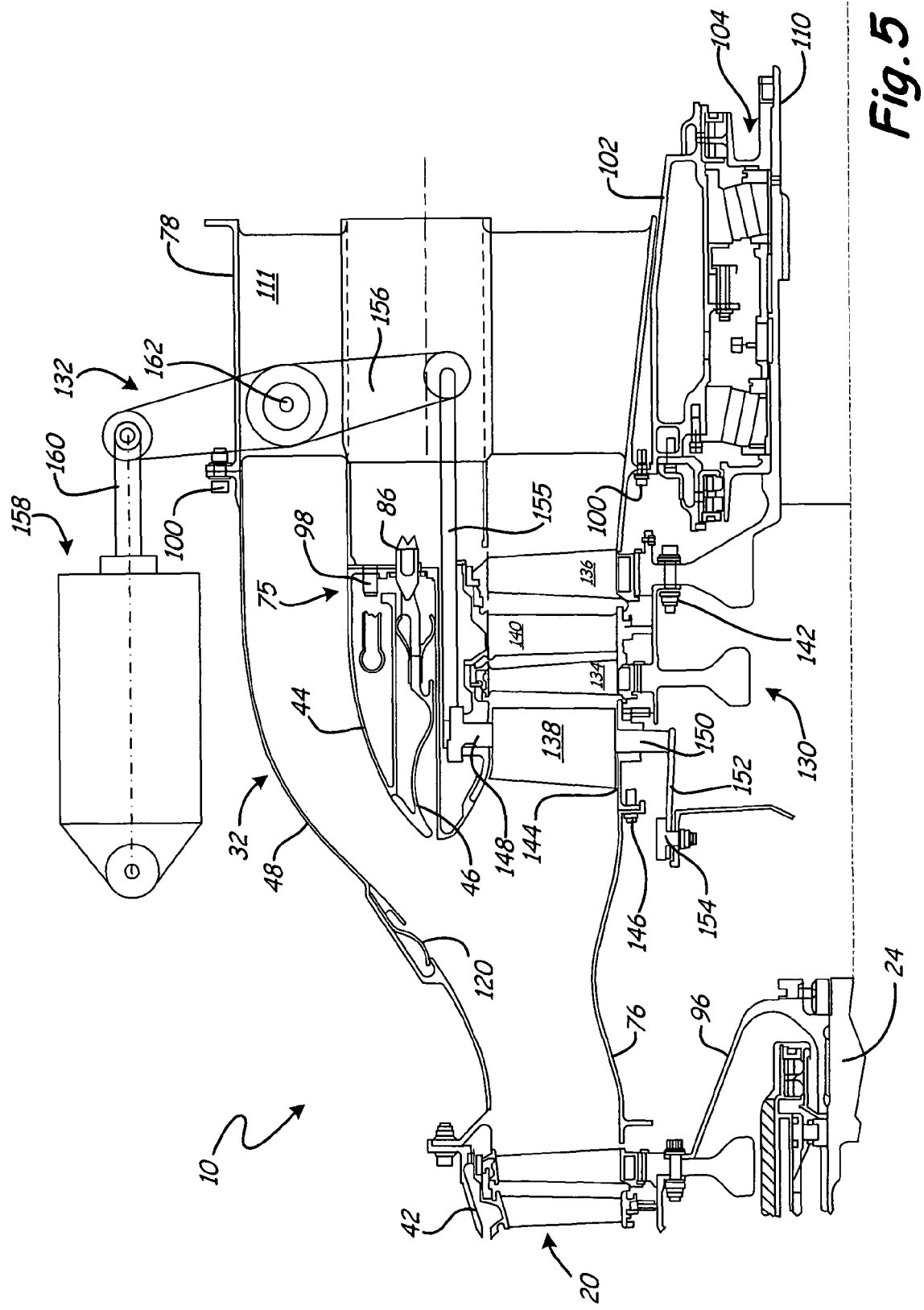
FIG. 5 shows a cross-sectional view of a second embodiment of the convertible gas turbine propulsion system of the present invention including a two-stage secondary power turbine having a variable vane actuation system.

Actuator 75 is connected to the aft end of inner duct 44, such as with threaded fasteners 98. Actuator 75 is disposed within aft duct 78, which is connected to the aft end of outer duct 48, such as with threaded fasteners 100. Aft duct 78 is supported by bearing housing 102, which is part of bearing assembly 104. Second power turbine 22, which includes vanes 106 and blades 108, drives output shaft 110, which is supported within exhaust system 32 by bearing assembly 104. The inner surface of inner duct 44 comprises a stationary rail to which vane 106 of second power turbine is secured. Blades 108 are attached to a rotor connected to output shaft 110, which is connected to shaft 30 such as with a spline for driving propeller 16 (FIG. 1). Aft duct 78 also includes a plurality of exit guide struts 111, which are disposed on either side of canister 84 within aft duct 78, to guide combustion gases $A_G$ out of propulsion system 10. Although FIGS. 4A and 4B show second power turbine including one set of turbine blades, as can be seen in FIG. 5, inner duct 44 includes space such that second power turbines having multiple stages can be readily incorporated into convertible gas turbine propulsion system 10.

In FIG. 4A, retractable port 46 of exhaust system 32 is retracted into inner duct 44 by actuator 75 such that exhaust gas $A_G$ is able to bypass second power turbine 22. Inner duct 44 comprises a hollow compartment, or plenum 112, which receives compressor bleed air from conduit similar to how plenum 60 receives compressor air $A_C$ from conduit 74 in FIGS. 3A and 3B. Compressor bleed air is used to actuate retractable port 46 within compartment 113. Plenum 112 also receives cooling air from cooling air manifold 90 to prevent overheating of inner duct 44 and actuator 75 from impingement of exhaust gas $A_G$. Conduit for cooling and actuation air can be routed through engine 10 to plenum 112 using any suitable pathway or number of pipes as needed, depending on design needs.

Retractable port 46 comprises an annular cowling that fits within compartment 113 of inner duct 44. Retractable port 46 includes head 114, tail 116 and leaf seal 118. Head 114 is configured for mating with nose seal 120 of outer duct 48. Leaf spring 118 seals off compartment 113 to prevent exhaust gas $A_G$ from entering inner duct 44, and to provide piston surface area for overcoming the force of spring 84. Spring 118 also centers and retains retractable port 46 within compartment 113. Tail 116 is configured to receive push rod 86 from within canister 80. Canister 80 comprises an elongate cylinder mounted to inner duct 44 axially downstream of compartment 113. Canister 80 provides a piston cylinder for housing push rod 86 and piston spring head 88. Push rod 86, which comprises a rigid beam, extends through the forward end of canister 80 and the aft end of compartment 113 to engage tail 116. Seal 122 surrounds push rod 86 to prevent air flow between canister 80 and compartment 113. Spring 84 is disposed within canister 80 between piston spring head 88 and spacer 124. Piston spring head 88 is affixed to the downstream end of push rod 86 such that spring 84 biases push rod 86 in the aft direction. Push rod 86 is affixed to tail 116 such that push rod 86 biases retractable port 46 in the aft direction. In the retracted position, spring 84 pushes piston spring head 88 in the aft direction to withdraw retractable port 46 from nose seal 120 and into compartment 113. Plenum 112 includes port 126, which permits compressor bleed air to enter compartment 113 to force retractable port 46 forward. In this embodiment, the rearward positioning of retractable port 46 such that pressure chamber 52 is open to ambient pressure is the default, fail safe mode of operation for exhaust system 32. For example, in the event of failure of plenum 112, retractable port 46 is pushed by spring 84 to the rearward position to open chamber 52 such that engine 10 operates to drive main rotor 14 as a conventional turboshaft, which is the most fuel efficient mode of operation.

FIG. 4B shows exhaust system 32 of convertible gas turbine engine 10 with pneumatic actuator 75 configured for high speed operation. In FIG. 4B, retractable port 46 of exhaust system 32 is extended from inner duct 44 by actuator 75 such that exhaust gas $A_G$ is prevented from bypassing second power turbine 22. Compressor bleed air enters plenum 112 from the previously mentioned conduit (not shown). Compressor bleed air fills plenum 112, which is sealed at its forward and aft ends, to force retractable port 46 forward by impinging on leaf seal 118. Seal 122 prevents compressor bleed air from leaking from compartment 113 into canister 80 such that piston force is not degraded. Leaf spring 118 seals the forward portion of compartment 113 near the aft end of retractable port 46. Leaf spring 118 engages the inner and outer diameter walls of compartment 113 to form a piston head. Leaf spring 118 traps compressor bleed air and provides an area upon which compressor bleed air pushes. The force with which leaf spring 118 and push rod 86 are pushed is equal to the pressure of compressor bleed air multiplied by the cross-sectional area of compartment 113. The pressure of compressor bleed air is controlled by compressor section 34 and valve 58. The area of compartment 113 is constrained by size requirements of actuator 75. The cross-sectional area of compartment 113 and the pressure of the compressor bleed air are selected to produce enough forward force to overcome the rearward force of spring 84. Thus, compressor bleed air pushes retractable port 46 out from compartment 113 and into passageway 54.

Push rod 86 and piston spring head 88 are also pulled in the forward direction within canister 80. Piston spring head 88 includes vent 128 to prevent pressurization of air within canister 80. Spring spacer 124 controls the stroke length of push rod 86 and can be replaced with different sized spacers for use in different embodiments of actuator 75. Retractable port 46 is pushed far enough in the forward direction such that head 114 engages nose seal 120. Leaf spring 118 is placed far enough back on retractable port 46 such that head 114 engages nose seal 120 to prevent further forward advancement of retractable port 46. Retractable port 46 is rigid to form a firm seal with nose seal 120 on outer duct 48. Head 114 is shaped to seal off bypass duct 54 when extended from inner duct 44. In the embodiment shown, head 114 includes a generally flat surface to engage nose seal 120, and a nose portion to engage outer duct 48. Nose seal 120 comprises a flexible seal that biases head 114 to retain the position of retractable port 46 against outer duct 48. As such, substantially all of exhaust gas $A_G$ is prevented from entering bypass passage 54 with leakage held to a minimum. Thus, a pressure differential ($P_3$–$P_2$) is produced across second power turbine 22 such that useful work can be extracted from exhaust gas $A_G$ to turn output shaft 110 and propeller 16. As with actuator 56 of FIGS. 3A and 3B, the distance that retractable port 46 is withdrawn from outer duct 48 can be varied through the use of valve 58 and a FADEC to control the pressure differential ($P_3$–$P_2$) across second power turbine 22.

As with actuator 56 of FIGS. 3A and 3B, actuator 75 utilizes a resource readily available within gas turbine propulsion system 10 to obtain the energy necessary to displace retractable port 46: compressed air. Compressed air is commonly bled from compressor sections within gas turbine engines for various cooling and actuating purposes. Actuators 56 and 75 are readily adapted to such systems to provide actuation power and to provide cooling of the actuators. Actuators 56 and 75 do not require supplies of oil for actuation, cooling or lubrication and thus do not require additional linkages or complexities associated with such sub-systems. Thus, actuators 56 and 75 provide easily integrated, lightweight and cost effective systems for displacing retractable port 46 and activating convertible gas turbine propulsion system 10 in a hot operating environment. Additionally, in other embodiments of the invention, the pneumatic thruster actuation of actuator 56 of FIGS. 3A and 3B and the pneumatic piston actuation of actuator 75 of FIGS. 4A and 4B can be combined to provide supplemental or redundant actuation systems.

FIG. 5 shows a cross-sectional view of a second embodiment of convertible gas turbine engine 10 of the present invention including a two-stage secondary power turbine 130 having a variable vane actuation system 132. Propulsion system 10 includes first power turbine 20, forward duct 42, inner duct 44, retractable port 46, outer duct 48, pneumatic actuator 75, flow guide 76, aft duct 78, stub shaft 96, fasteners 98 and 100, bearing housing 102, bearing assembly 104, output shaft 110, exit guide struts 111 and nose seal 120, which function similarly to what is described with respect to FIGS. 4A and 4B. A portion of push rod 86 of pneumatic actuator 75 is shown, however, other components are omitted from FIG. 5 for clarity. Power turbine 130 is connected with output shaft 110 in a similar manner as is second power turbine 22. Power turbine 130, however, includes first stage blades 134 and second stage blades 136, which are inter-disposed with variable stator vanes 138 and stationary vanes 140. First stage blades 134 and second stage blades 136 are connected to rotor disks, which are connected to each other with threaded fastener 142. As such, first stage blades 134 and second stage blades 136 rotate to drive output shaft 110 when driven by exhaust gas $A_E$, such as when retractable port 46 is extended into bypass passage 54. Stationary vane 140 is suspended from the inner surface of inner duct 44 and suspended between first stage blades 134 and second stage blades 136. Variable stator vanes 138 are disposed between inner duct 44 and inner shroud 144, which are connected to the aft end of flow deflector 76 with threaded fastener 146. Variable vanes 138 include inner and outer trunnions 150 and 148, respectively, upon which variable vanes 138 rotate. Inner trunnions 150 rotate within inner shroud 144 and outer trunnions 148 rotate within the bottom surface of inner duct 44. Each inner trunnion 150 includes a crank arm 152 that is connected to inner sync ring 154, which coordinates the rotation of variable vanes 138 between inner shroud 144 and inner duct 44. Crank arms 152 apply rotational torque to inner trunnions 150 when activated by variable vane actuation mechanism 132.

Outer trunnions 148 are connected to actuation mechanism 132, which comprises linkage 155, idler 156, and actuator 158. Actuation mechanism 132 extends from outside of outer duct 48 to inside inner duct 44 through exit guide strut 111. Actuator 158, which in the embodiment shown comprises a hydraulic or pneumatic cylinder, is mounted to propulsion system 10 outside of outer duct 48 such that actuator 158 remains stationary with respect to outer duct 48 and is positioned in a cool environment conducive to satisfactory operation of actuation mechanism 132 and other conventional actuation systems. Piston rod 160 extends from actuator 158 and connects with idler 156. Idler 156 extends through outer duct 48 and into exit guide strut 111, where idler 156 is pinned at pin 162. The outer end of idler is connected with piston rod 160 and the inner end of piston rod 160 is connected to linkage 155. Piston rod 160 moves the outer end of idler 156 such that idler 156 rotates about pin 162. Linkage 155 extends axially from idler 156 to outer trunnions 148. A trunnion of a master variable vane includes a master crank arm such that rotational torque applied to the master variable vane is transmitted to variable vanes 138 through torque ring 154. For example, piston rod 160 is pulled within actuator 158 through hydraulic or pneumatic pressure activation, which causes idler 156 to pull linkage 155 rearward from inner duct 44. Linkage 155 pulls the master crank arm, which rotates the master variable vane. The master variable vane rotates one of crank arms 152, which then rotates the other crank arms 152 through torque ring 154 to rotate the full array of variable vanes 138. As such, the amount of energy extracted from second power turbine 130 can be varied. Specifically, the pressure differential across second power turbine 130 can be varied with variable vanes 138 to regulate the power input to propeller 16 and hence the amount of forward thrust produced.

Figure 6:
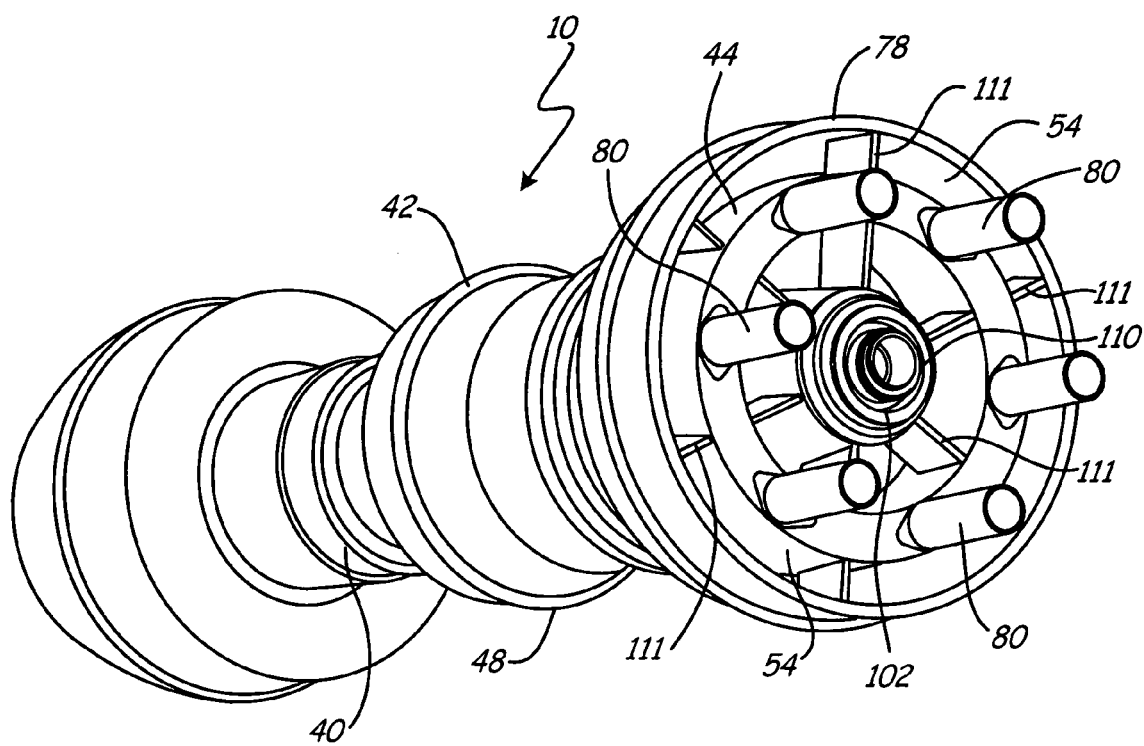
FIG. 6 shows a perspective view of the aft end of the convertible gas turbine engine of FIGS. 4A and 4B.

FIG. 6 shows a perspective view of the aft end of convertible gas turbine propulsion system 10 of FIGS. 4A and 4B. Propulsion system 10 includes gas generator casing 40, which shrouds gas generator 18; second engine case 42, which shrouds first power turbine 20; outer duct 48, which shrouds second power turbine 22; and aft duct 78, which shrouds inner duct 44. Inner duct 44 comprises an annular structure that is supported between outer duct 48 and bearing housing 102 by exit guide struts 111 to form bypass passage 54. Struts 111 include annular passages that receive canisters 80 of actuation mechanism 75 and, as such, form downstream extensions of inner duct 44 (as is seen in FIGS. 4A and 4B). Output shaft 110 is disposed within bearing housing 102 and is connected with second power turbine 22, the blades of which are disposed forward of exit guide struts 111 between inner duct 44 and bearing housing 102. Propeller shaft 30 is connected with output shaft 110 to drive propellers 16 (FIGS. 1-2B and 4). Inner duct 44 comprises a hollow structure that houses retractable port 46, which is extendable from inner duct 44 to guide flow of exhaust gas $A_E$ through second power turbine 22. Inner duct 44 also provides a platform onto which to mount actuators 75 (not shown), including canisters 80. Canisters 80 include springs that push retractable port 46 forward to close off bypass passage 54. The number of actuators 75 and canisters 80 is selected to generate enough rearward spring force to retract retractable port 46. Likewise, the number of actuators 75 and canisters 80 is selected to generate enough forward pneumatic force to extend retractable port 46 from inner duct 44. Actuators 75 and canisters 80 are distributed evenly around inner duct 44 such that retractable port 46 easily extends from and contracts within inner duct 44 without binding. Canisters 80 include springs 84 (FIGS. 4A & 4B) that pull retractable port 46 to the retracted, fail safe position, such that engine 10 operates as a conventional turboshaft and second power turbine 22 within inner duct 44, or the exhaust nozzle formed by inner duct 44 ceases operation. In the embodiment shown, six actuators having six canisters 80 are used to push retractable port 46 from inner duct 44. In one embodiment, outer duct 48, aft duct 78 and canisters 80 extend the length of engine 10 approximately 19 inches (~48.3 cm). Variable vane actuation system 132 of FIG. 5 can also be incorporated into propulsion system 10 of FIG. 6. For example, actuation system 132 could be integrated into one of the six shown exit guide struts 111, such that in FIG. 6, an idler 156 would extend radially from one of exit guide struts 111 to connect with an actuator 158 disposed axially along outer duct 48.

The various embodiments of convertible gas turbine propulsion system 10 of the present invention provide a means for splitting power between primary and secondary propulsion systems. Each propulsion system can be individually modulated to produce a desired amount of propulsive thrust such that, for example, vertical and horizontal thrust levels can be controlled to increase engine fuel efficiency and performance at high forward speeds. The convertible gas turbine propulsion system includes actuators that utilize available engine resources, such as pneumatic power, to distribute power between the first and second propulsion systems such that additional bulky and heavy actuation systems are unnecessary.

Although the present invention has been described with reference to preferred embodiments, workers skilled in the art will recognize that changes may be made in form and detail without departing from the spirit and scope of the invention.

The invention claimed is:

1. A convertible gas turbine propulsion system operable in multiple output modes, the propulsion system comprising:
    a gas generator for producing exhaust gas;
    a gas generator turbine driven by the exhaust gas;
    a first power turbine aligned in series with the gas generator turbine to receive the exhaust gas;
    a primary propulsion system coupled to the first power turbine and configured to produce thrust in a first axial direction;
    a secondary propulsion system in series with the gas generator turbine and the first power turbine, such that the propulsion system is configured to direct airflow in series through the gas generator turbine, the first power turbine and the secondary propulsion system, wherein the secondary propulsion system is configured to produce thrust in a second axial direction transverse to the first axial direction;
    an exhaust duct coaxially extending from the first power turbine to the secondary propulsion system to direct exhaust gas into the secondary propulsion system;
    an exhaust port positioned within the exhaust duct between the first power turbine and the secondary propulsion system; and
    a retractable annular cowling for selectively opening the exhaust port to ambient air pressure axially between the first power turbine and the secondary propulsion system to permit exhaust gas to bypass the secondary propulsion system, the entire retractable annular cowling being axially displaceable from a first position axially spanning the exhaust port to a second position axially adjacent the exhaust duct.

2. The propulsion system of claim 1 wherein the first power turbine and the gas generator turbine are configured as a turboshaft engine.

3. The propulsion system of claim 1 wherein the exhaust port effectively ceases powered output of the secondary propulsion system by the exhaust gas when the retractable annular cowling is in an open position by producing a negligible pressure differential across the secondary propulsion system.

4. The propulsion system of claim 1 wherein the exhaust gas effectively powers the secondary propulsion system when the retractable annular cowling is in a closed position by producing an operable pressure differential across the secondary propulsion system.

5. The propulsion system of claim 1 wherein the secondary propulsion system is coupled to a second power turbine mechanically uncoupled from the first power turbine such that the first power turbine and the second power turbine rotate independently and such that the propulsion system is configured to direct the exhaust gas in series through the gas generator turbine, the first power turbine and the second power turbine.

6. The propulsion system of claim 5 and further comprising:
    a first shaft connected to the first power turbine for driving a first rotary output system comprising the primary propulsion system; and
    a second shaft connected to the second power turbine for driving a second rotary output system comprising the secondary propulsion system.

7. The propulsion system of claim 6 wherein:
    the first rotary output system comprises a rotary propulsion system connected to the first shaft for providing vertical and horizontal thrust; and
    the second rotary output system comprises a propeller propulsion system connected to the second shaft for producing horizontal thrust.

8. The propulsion system of claim 1 wherein:
    the first power turbine is connected to a rotary propulsion system comprising the primary propulsion system; and
    the secondary propulsion system comprises a nozzle for accelerating the exhaust gas.

9. A gas turbine propulsion system comprising:
    a primary propulsion system comprising:
        a combustor for producing exhaust gas; a gas generator turbine powered by the exhaust gas;
        a first power turbine powered by the exhaust gas;
        a first propulsor connected to the first power turbine and configured to produce thrust in a first axial direction;
        a compressor connected to the gas generator turbine; and
        an annular first exhaust duct extending from the first power turbine;
    a secondary propulsion system including:
        an annular second exhaust duct positioned an axial distance aft of the first power turbine radially within a downstream end of the first exhaust duct to define a bypass passage radially outward of the annular second exhaust duct and radially inward of the downstream end of the first exhaust duct; and
        a retractable annular cowling comprising a ring radially disposed between the first exhaust duct and the second exhaust duct axially aft to the axial distance in an open position, wherein the cowling is axially displaceable to span the axial distance and close the bypass passage turbine in a closed position for selectively closing off flow of the exhaust gas to the bypass passage; and a second propulsor configured to receive the exhaust gas and produce thrust in a second axial direction transverse to the first axial direction.

10. The gas turbine propulsion system of claim 9 wherein:
the first annular exhaust duct is radially larger at a second end than at a first end such that the first annular exhaust duct surrounds the second annular exhaust duct; and
the retractable cowling is positioned within the second annular exhaust duct.

11. The gas turbine propulsion system of claim 10 wherein the second propulsor includes a second power turbine that is disposed within the second exhaust duct downstream of the first power turbine such that the propulsion system is configured to direct the exhaust gas in series through the gas generator turbine, the first power turbine and the second power turbine.

12. The gas turbine propulsion system of claim 11 wherein the second power turbine is mechanically uncoupled from the first power turbine.

13. The gas turbine propulsion system of claim 11 wherein the annular cowling controls a pressure differential across the second power turbine.

14. The gas turbine propulsion system of claim 11 wherein the annular cowling produces a greater pressure differential across the second power turbine when in the closed position as compared to a pressure differential across the second power turbine when in an open position.

15. The gas turbine propulsion system of claim 11 wherein the annular cowling opens the bypass passage to ambient pressure when in the open position.

16. The gas turbine propulsion system of claim 11 wherein:
the first propulsor is connected to the second power turbine.

17. The gas turbine propulsion system of claim 16 wherein the first propulsor comprises horizontal rotors and the second propulsor comprises vertical rotors.

18. The gas turbine propulsion system of claim 11 wherein the second power turbine includes variable vanes and a variable vane actuation mechanism to regulate pressure differential across the second power turbine.

19. The gas turbine propulsion system of claim 10 wherein the second annular exhaust duct comprises an exhaust nozzle such that the second propulsor comprises a flow accelerating duct.

20. A gas turbine propulsion system comprising:
a gas generator combustor for producing exhaust gas;
a gas generator turbine for receiving exhaust gas from the combustor;
a first power turbine disposed downstream from the gas generator turbine;
a first rotary propulsion system connected to the first power turbine and including a first output shaft extending in a first axial direction;
a first exhaust duct positioned aft of the first power turbine to define a pressure chamber, wherein the first power turbine is driven by a pressure differential between the gas generator turbine and the pressure chamber;
a second power turbine downstream of the first power turbine within the first exhaust duct such that the propulsion system is configured to direct the exhaust gas in series through the gas generator turbine, the first power turbine, the pressure chamber and the second power turbine,
a second exhaust duct extending into the pressure chamber within the first exhaust duct, wherein the second exhaust duct includes an axially retractable annular cowling comprising a ring that is selectively positioned to control a pressure differential across the second power turbine; and
a second rotary propulsion system connected to the second power turbine and including a second output shaft extending in a second axial direction transverse to the first axial direction.

21. The gas turbine propulsion system of claim 20 wherein the axially retractable annular cowling of the second exhaust duct is positioned in an open configuration to produce a negligible pressure differential across the second power turbine.

22. The gas turbine propulsion system of claim 20 wherein the negligible pressure differential across the second power turbine permits the second power turbine to windmill.

23. The gas turbine propulsion system of claim 20 wherein the axially retractable annular cowling of the second exhaust duct is positioned in a closed configuration to produce a pressure differential across the second power turbine proportional to the pressure in the pressure chamber and ambient pressure aft of the second power turbine.

* * * * *